US012730720B2

(12) United States Patent
Chen et al.

(10) Patent No.: US 12,730,720 B2
(45) Date of Patent: Sep. 8, 2026

(54) FAULT DETECTION BASED ON DEVICE COMPONENT IDENTIFIERS

(71) Applicant: Hewlett Packard Enterprise Development LP, Spring, TX (US)

(72) Inventors: Chao Hsu Chen, Taipei (TW); Apoorva Srivastava, Bangalore Karnataka (IN); Hong-Jen Hsu, New Taipei City (TW); Ying-Jie Wang, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 44 days.

(21) Appl. No.: 18/748,211

(22) Filed: Jun. 20, 2024

(65) Prior Publication Data

US 2025/0307076 A1 Oct. 2, 2025

(30) Foreign Application Priority Data

Apr. 1, 2024 (IN) ............................ 202411027115

(51) Int. Cl.
*G06F 11/00* (2006.01)
*G06F 11/07* (2006.01)
*G06F 11/14* (2006.01)

(52) U.S. Cl.
CPC ...... *G06F 11/1441* (2013.01); *G06F 11/0772* (2013.01); *G06F 11/1435* (2013.01)

(58) Field of Classification Search
CPC ............. G06F 11/1441; G06F 11/0772; G06F 11/1435; G06F 11/0745; G06F 11/0793; G06F 11/1417; G06F 11/2221; G06F 11/3041; G06F 11/3051
See application file for complete search history.

(56) References Cited

U.S. PATENT DOCUMENTS 11,093,321 B1 * 8/2021 Zeavelou ............ G06F 11/0793
2019/0004901 A1 * 1/2019 Ryan ..................... G06F 1/3253
2019/0073285 A1 * 3/2019 Hayashida .......... G06F 11/0757
2022/0129350 A1 * 4/2022 Sharma ................. G06F 3/0619

(Continued)

OTHER PUBLICATIONS

"Endpoint Identifier", available online at <https://www.sciencedirect.com/topics/computer-science/endpoint-identifier>, 2024, 10 pages.

(Continued)

*Primary Examiner* — Joseph D Manoskey
(74) *Attorney, Agent, or Firm* — Hewlett Packard Enterprise Patent Department

(57) ABSTRACT

A system retrieves, from a management controller of an electronic device, identifiers of device components in the electronic device, where the retrieved identifiers of the device components are assigned in management operations according to a management protocol. The system accesses resource metadata representing resources of the electronic device, the resource metadata stored at the management controller. The system checks the retrieved identifiers assigned in the management operations according to the management protocol based on information of the resources represented by the resource metadata. Based on the check, the system determines whether a fault is present in the electronic device.

19 Claims, 4 Drawing Sheets

(56) References Cited

U.S. PATENT DOCUMENTS

2024/0345915 A1* 10/2024 Liu .................... G06F 11/0793

OTHER PUBLICATIONS

Chris Vetter, "Removing Duplicate Device Objects from Configuration Manager with PowerShell", Apr. 25, 2022, 7 pages.

Cisco, "MCTP-Based Server Configuration and Management in Cisco Ucs M6 Generation White Paper", Sep. 20, 2021, 15 pages.

Jeff Hilland, "Redfish ecosystem for storage", Sep. 2019, 20 pages.

Wikipedia, "Locator/Identifier Separation Protocol", available online at <https://en.wikipedia.org/wiki/Locator/Identifier_Separation_Protocol#cite_note-5>, Aug. 2021, 6 pages.

Cisco, Network Working Group, Internet-Draft, "LISP Analysis draft-brim-lisp-analysis-00.txt", Mar. 10, 2008 (29 pages).

Farinacci et al., "The Locator/ID Separation Protocol (LISP)", Internet Engineering Task Force (IETF), Request for Comments: 6830, Jan. 2013, 75 pages.

Slaight, Tom, "Management Component Transport Protocol (MCTP)", Dec. 3-6, 2007 (24 pages).

Wikipedia, "Management Component Transport Protocol", available online at <https://en.wikipedia.org/w/index.php?title=Management_Component_Transport_Protocol&oldid=1171169992>, Aug. 19, 2023, 2 pages.

Wikipedia, "Redfish (specification)", available online at <https://en.wikipedia.org/w/index.php?title=Redfish_(specification)&oldid=1197912171>, Jan. 22, 2024, 4 pages.

* cited by examiner

FAULT DETECTION BASED ON DEVICE COMPONENT IDENTIFIERS

BACKGROUND

An electronic device can include various device components, such as bus components connected to one or more buses of the electronic device. An entity inside or outside of the electronic device can perform communications with the device components, such as to perform management of or other operations with the device components.

BRIEF DESCRIPTION OF THE DRAWINGS

Some implementations of the present disclosure are described with respect to the following figures.

Figure 1:
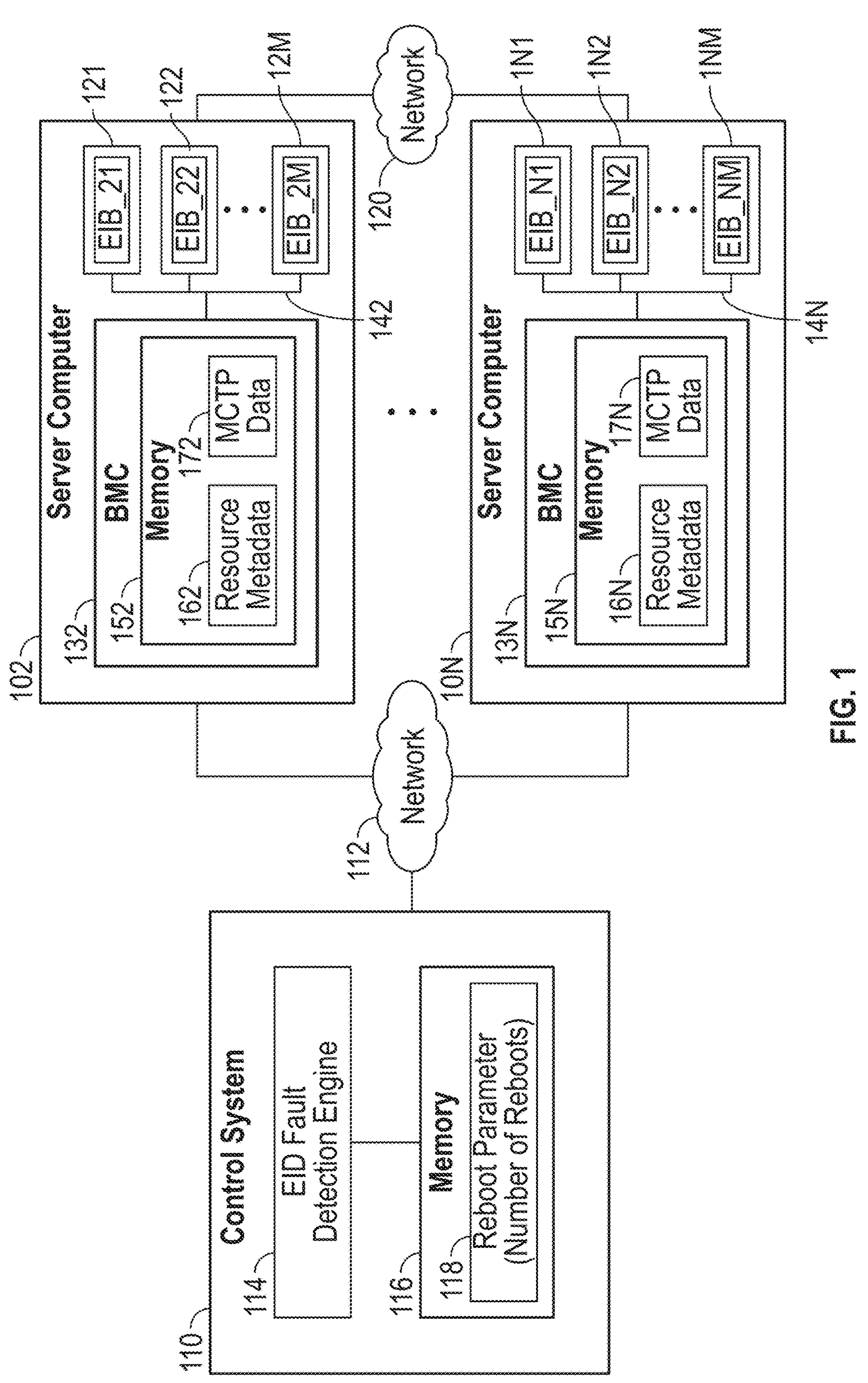
FIG. 1 is a block diagram of an arrangement that includes server computers and a control system for detecting endpoint identifier (EID) faults in the server computers, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Endpoint identifiers (EIDs) may be assigned to device components of an electronic device. In some examples, EIDs are used as logical addresses for communicating management-related data according to the Management Component Transport Protocol (MCTP) in a platform management system. MCTP supports monitoring and control functions relating to the device components inside the electronic device (referred to as a "managed system"). An EID can refer to any type of identification information (e.g., an integer or another value) that can be used to identify a device component such that another component can interact with the device component.

Faults may arise in an electronic device that can lead to issues associated with assignment of EIDs to device components in the electronic device. The faults can lead to mis-assignments of EIDs. A first type of EID fault includes an EID loss in which a device component is not assigned an EID. An EID loss can result in other components not being able to access the device component associated with the EID loss (i.e., the device component that is not assigned an EID). In some cases, device components can be accessed to perform various management operations of the device components, such as to update machine-readable instructions (including firmware and/or software) of the device components, obtain status information of the device components, reconfigure the device components, or other maintenance actions. In other cases, device components may be accessed for other purposes, such as to perform operations in the electronic device or to perform operations between the electronic device and another entity (a user, a program, or a machine).

A second type of EID fault includes duplicative assignments of EIDs, in which the same EID is assigned to multiple device components of the electronic device. Duplicative assignments of the same EID to multiple device components can result in conflicts in operations performed with the multiple device components.

In accordance with some implementations of the present disclosure, an identifier fault detection system is able to detect identifier mis-assignments (such as EID faults) using different data sets available at a management controller of an electronic device. The management controller performs various management tasks of the electronic device. An example of the management controller is a baseboard management controller (BMC).

The different data sets available at the management controller include resource metadata that represents a configuration of resources in the electronic device. The resources can include device components as well as other components of the electronic device. The resource metadata specifies what components are supposed to be part of the electronic device, according to how the electronic device is configured by a manufacturer, an assembler, or other entity.

The different data sets available at the management controller further include management data collected as part of management operations performed according to a management protocol, such as the MCTP. The resource metadata and the management data (e.g., MTCP data) can be retrieved by a control system, which can detect an identifier mis-assignment in the electronic device based on the resource metadata and the management data.

Examples of electronic devices can include server computers, desktop computers, notebook computers, storage systems, communication nodes, or other types of electronic devices. An electronic device that is managed using the MCTP or another management protocol is referred to as a "managed system."

An electronic device can include various different device components. A "device component" can refer to an electronic part that can be part of a larger electronic device. Examples of device components can include any or some combination of the following: network interface controllers (NICs), graphics controllers, input/output (I/O) devices, memory devices, storage devices, processors, accelerators, and/or other electronic parts. A device component that supports MCTP includes a function (e.g., implemented with machine-readable instructions executed by the device component) that supports MCTP communications. An EID is assigned to the function in the device component.

In the context of MCTP operations, an endpoint refers to a function within a device component that terminates MCTP communications, including MTCP control commands and other MTCP packets. MCTP packets are routed using EIDs assigned to functions in device components. A "function" in a device component can be implemented using hardware processing circuitry or machine-readable instructions of the device component.

Although various examples discussed herein refer to MCTP, it is noted that in other examples, other protocols may be used that govern communications with device components in electronic devices.

FIG. 1 is a block diagram of an example arrangement that includes N (N≥1) server computers 102 to 10N. Although FIG. 1 depicts an example with multiple server computers, in other examples, just one server computer can be part of another example arrangement.

The server computers 102 to 10N are examples of electronic devices subject to management using MCTP. Each server computer includes a number of device components. For example, the server computer 102 includes device components 121, 122, . . . , 12M, where M≥1. Similarly, the server computer 10N includes device components 1N1, 1N2, . . . , 1NM. Although the example of FIG. 1 shows each server computer as having the same quantity of device components, in other examples, different server computers may have different quantities of device components.

Each device component can be assigned a respective EID. A device component being assigned an EID refers to a function within the device component being assigned the EID, where the function can terminate an MCTP communication. The device components 121, 122, . . . , 12M in the server computer 102 are assigned respective EIDs EID_21, EID_22, . . . , EID_2M, and the device components 1N1, 1N2, . . . , 1NM in the server computer 10N are assigned respective EIDs EID_N1, EID_N2, . . . , EID_NM Each server computer also includes a BMC. The server computer 102 includes a BMC 132, and the server computer 10N includes a BMC 13N. A BMC is connected to device components in a server computer over one or more buses. For example, the BMC 132 is connected over one or more buses 142 to the device components 121 to 12M, and the BMC 13N is connected over one or more buses 14N to the device components 1N1 to 1NM.

The device components connected to one or more buses are referred to as bus components each capable of communicating over a bus that the bus component is connected to. Examples of buses in a server computer can include any or some combination of the following: a Peripheral Component Interconnect Express (PCIe) bus, an InfiniBand bus, or another type of interconnect that allows a device component to communicate with another component in the server computer. If a bus is a PCIe bus, then a bus component connected to the PCIe bus is referred to as a PCIe bus component. Similarly, a bus component connected to an InfiniBand bus is referred to as an InfiniBand bus component.

A control system 110 is connected over a network 112 to the server computers 102 to 10N. The control system 110 can be implemented using one or more computers. The network 112 can include a management network that is separate from a primary network 120 to which the server computers 102 to 10N are connected. The primary network 120 is used by primary machine-readable instructions, such as an operating system (OS) and an application program, running in a server computer. The management network 112, on the other hand, is an out-of-band network that is used for management operations with respect to the server computer.

The control system 110 includes an EID fault detection engine 114. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In more specific examples, the EID fault detection engine 114 can be implemented as a script or other machine-readable instructions executed by a processing resource of the control system 110. A processing resource can include one or more hardware processors. A hardware processor can include a microprocessor, a core of a multi-core microprocessor, a microcontroller, a programmable integrated circuit, a programmable gate array, or another hardware processing circuit.

The EID fault detection engine 114 is able to detect EID faults in one or more of the server computers 102 to 10N. In some examples, there may be multiple instances of the EID fault detection engine 114 to detect EID faults in respective server computers. EID faults can include an EID loss, an EID duplication, or any other type of mis-assignments of EIDs to device components. An EID loss may be caused by a device component not responding to the MCTP bus owner, or alternatively, may be caused by a fault of the MCTP bus owner. An EID duplication may also be caused by a faulty device component or MCTP bus owner.

In this ensuing discussion, reference is made to interactions between the control system 110 and the server computer 102. Similar interactions can be performed between the control system 110 and the other server computer 10N.

The BMC 132 includes a memory 152 to store data. In other examples, the memory 152 is external of the BMC 132, but the BMC 132 is able to access the memory 152. A memory can be implemented using one or more memory devices, including any or some combination of the following: a dynamic random access memory (DRAM) device, a static random access memory (SRAM) device, a flash memory device, a disk-based storage device, a solid state drive, or any other type of storage component.

In some examples, the memory 152 can store resource metadata 162 and MCTP data 172. The resource metadata 162 represents a configuration of resources of the server computer 102, i.e., the resources that are part of the server computer 102 according to how the server computer 102 was configured at the time of manufacture, assembly, or at any other stage of development of the server computer 102. The resources of the server computer 102 can include the device components 121 to 12M, as well as other types of resources, including other hardware resources and/or resources implemented as machine-readable instructions (e.g., software resources or firmware resources).

In some examples, the resource metadata 162 can include a Java Script Object Notation (JSON) file (or multiple JSON files) that contains various properties describing resources of the server computer 102. An entity (e.g., a manufacturer, an assembler, or another entity) configuring the server computer 102 can write the JSON file to the memory 152 of the BMC 132. In some examples, the properties of the JSON file can be according to the Distributed Management Task Force (DMTF) Redfish standard, which supports the management of devices such as server computers, storage systems, networking equipment, or other devices. In other examples, the resource metadata 162 can have other formats and can be according to other protocols, whether standardized, open source, or proprietary.

The resource metadata 162 can be written to the memory 152 of the BMC 132 through an interface of the BMC 132, such as a Redfish application programming interface (API), a REpresentational State Transfer (REST) API, or any other type of interface through which an entity external of the BMC 132 can communicate with the BMC 132. For example, an administrator or other user at a user device can access the BMC 132 through the BMC's interface and write the resource metadata 162 to the BMC 132.

In accordance with some examples of the present disclosure, the resource metadata 162 includes device component properties (e.g., in the form of parameters, fields, or other information elements) that are specifically included to represent device components (including 121 to 12M) that should be present in the server computer 102 according to the configuration of the server computer 102. The device component properties may include designated keywords to indicate that the device component properties represent device components that are part of the server computer 102 and that are subject to management according to MCTP (or another management protocol).

The represented device components are those subject to management according to a management protocol such as the MCTP. The device component properties that represent the device components 121 to 12M can include some form of identification information (e.g., a serial number or other type of identifier) to identify the respective device components 121 to 12M. Based on the device component properties in the resource metadata 162, the EID fault detection engine 114 knows how many device components are in the server computer 102 that are subject to management according to the management protocol such as the MCTP.

The MCTP data 172 includes data collected according to MCTP operations performed with respect to the server computer 102, and more specifically, with respect to the device components 121 to 12M of the server computer 102. In some examples, the MCTP operations can be performed over the one or more buses 142 with the device components 121 to 12M. More generally, the memory 152 of the BMC 132 stores management data for the device components 121 to 12M collected using management operations according to a management protocol.

In some examples, the BMC 132 can be an MCTP bus owner that is responsible for initiating MCTP operations that assign EIDs of device components. For example, the BMC 132 can be connected over a bus to one or more device components. The BMC 132 as the bus owner can assign the EIDs to the one or more device components on this bus. There may be other buses that are indirectly coupled to the BMC 132, such as through MCTP bridges. An MCTP bridge is responsible for routing MCTP packets between two or more buses. An MCTP bridge is a bus owner of at least one bus, and the MCTP bridge is responsible for assigning EIDs to device components connected to the bus(es) of the MCTP bridge. EIDs assigned by an MCTP bridge may be provided to the BMC 132. The BMC 132 collects EIDs assigned according to MCTP operations over the one or more buses 142, and the BMC 132 stores the collected EIDs in the MCTP data 172. In addition to the EIDs assigned to the device components 121 to 12M, the MCTP data 172 can include other management-related data associated with the device components 121 to 12M.

In other examples, an entity different from the BMC 132 is the bus owner for MCTP operations. In such examples, the different entity obtains EIDs assigned to the device components 121 to 12M. The BMC 132 is able to acquire, from the different entity, the EIDs assigned to the device components 121 to 12M.

Similarly, the BMC 13N includes a memory 15N that stores resource metadata 16N and MCTP data 17N. The resource metadata 16N and the MCTP data 17N contain information associated with the device components 1N1 to 1NM in the server computer 10N.

MCTP uses logical addressing (including the EIDs) in communications between MCTP endpoints, including the endpoints in device components of a respective server computer. If an EID mis-assignment occurs, then MCTP operations may fail. The MCTP operations may be initiated within the server computer, such as by the BMC or another entity. Alternatively, MCTP operations may be initiated by a remote device coupled to the server computer over a network (e.g., the network 112 or another network).

Figure 2:
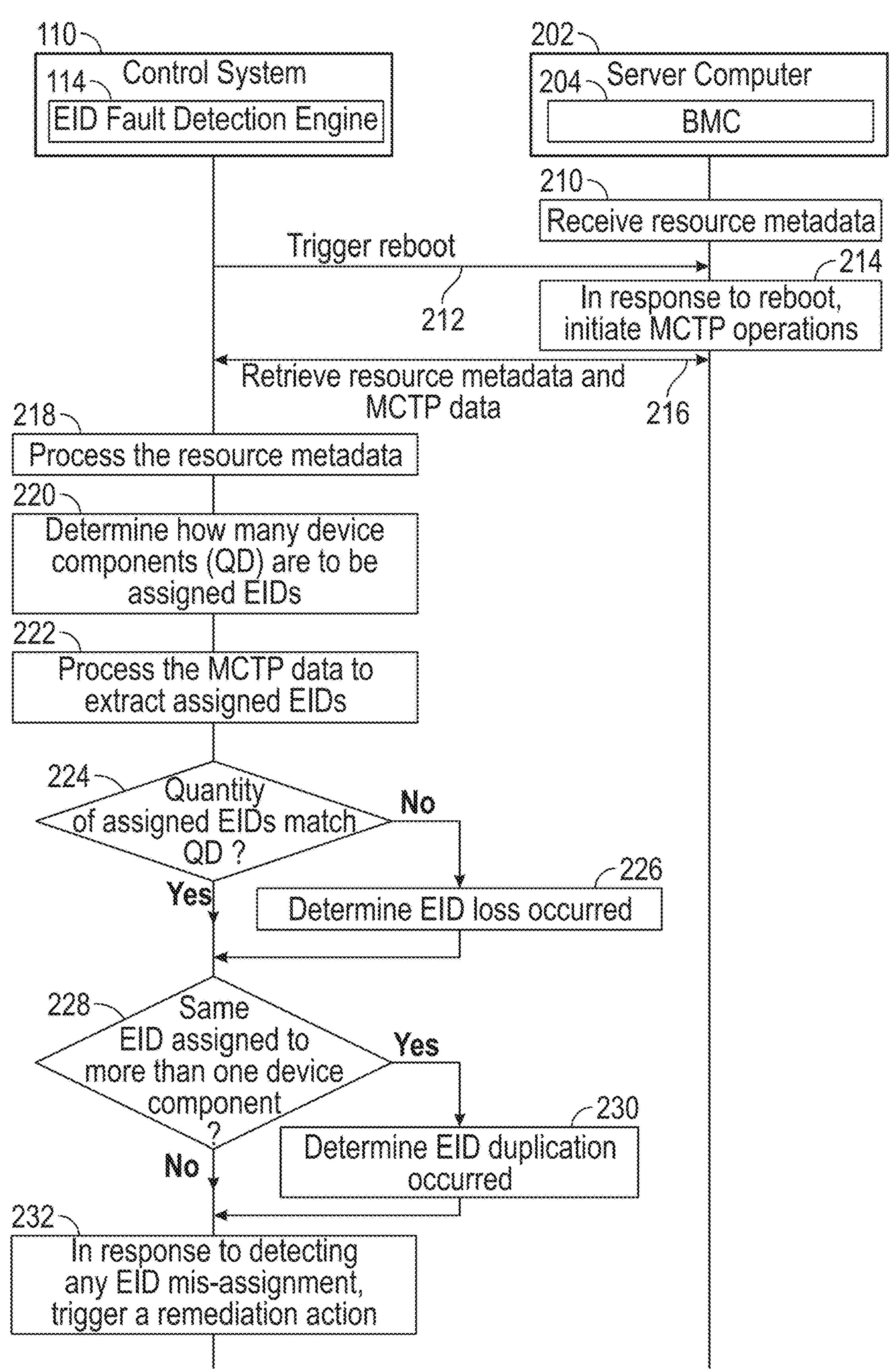
FIG. 2 is a flow diagram of a process of detecting EID faults in a server computer using the control system, according to some examples.

The following discussion refers to both FIG. 1 and FIG. 2. FIG. 2 is a message flow diagram of a process associated with EID fault detection. The process involves the control system 110 and a server computer 202, which can be one of the server computers 102 to 10N of FIG. 1. The server computer 202 includes a BMC 204, which can be one of the BMCs 132 to 13N of FIG. 1. Although FIG. 2 shows a specific order of tasks, in other examples, the tasks can be performed in a different order, some tasks may be omitted, and/or other tasks may be added.

The BMC 204 receives (at 210) resource metadata (e.g., including one or more JSON files, for example), such as any of the resource metadata 162 to 16N of FIG. 1. The BMC 204 stores the resource metadata in a memory associated with the BMC 204. The memory associated with the BMC 204 can be in the BMC 204 or external of the BMC 204.

The resource metadata can be received from an entity during initial configuration of the server computer 202, such as from a device of a server computer manufacturer, an assembler, or other entity. Alternatively or additionally, the resource metadata can be received after the server computer 202 has been initially configured. For example, updated resource metadata can be provided to the BMC 204 if the configuration of the server computer 202 is modified, such as due to addition, removal, or replacement of device components in the server computer 202.

The EID fault detection engine 114 in the control system 110 can trigger (at 212) a reboot of the server computer 202. For example, the EID fault detection engine 114 can send a reboot command to the BMC 204, which causes the BMC 204 to reboot the server computer 202. A "command" can be in the form of a message, an information element, or any other type of indicator that requests performance of an action.

In some examples, the EID fault detection engine 114 can cause reboot of the server computer 102 a specified quantity of times, based on a reboot parameter 118 stored in a memory 116 of the control system 110. The reboot parameter 118 specifies a quantity (1 or more than 1) of reboots of a managed system (in this case the server computer 202) that is (are) to be triggered. The reboot parameter 118 can be specified by a user or any other entity.

The reboot of the server computer 202 causes MCTP operations to be initiated (at 214) in the server computer 202. For example, if the BMC 204 is the MCTP bus owner, then the BMC 204 can initiate MCTP operations to acquire management-related data, including EIDs assigned to device components of the server computer 202. In other examples, a different entity in the server computer 202 can be the MCTP bus owner that initiates MCTP operations in response to a reboot of the server computer 202.

In either case (whether the BMC 204 is the MCTP bus owner or another entity is the MCTP bus owner), the BMC 204 acquires the assigned EIDs and stores the assigned EIDs as part of MCTP data in the memory associated with the BMC 204.

If the reboot parameter 118 specifies that multiple reboots of the server computer 202 are to be triggered, the EID fault detection engine 114 can trigger successive reboots of the server computer 102. In response to each successive reboot of the server computer 202, MCTP operations are initiated and management-related data is acquired by the BMC 204 and stored as part of the MCTP data.

A reason to perform one or more reboots of the server computer 202 is to apply a stress test of the server computer 202. If any of the components (e.g., the device components of the server computer 202, an MCTP bus owner such as the BMC 204 or another entity, a bus, machine-readable instructions, etc.) in the server computer 202 involved in MCTP operations are faulty or on the verge of becoming faulty, stress testing the server computer 202 by triggering reboots can increase the likelihood that the components will exhibit faults during MCTP operations. The faults can lead to EID mis-assignments, including EID loss and EID duplication, for example. Faulty operations can occur in device components or in the BMC, or. Additionally, buses or machine-readable instructions may exhibit errors that can lead to EID mis-assignments.

Once the quantity of reboots (one reboot or multiple reboots) configured by the reboot parameter 118 has been performed at the server computer one 202, the EID fault detection engine 114 can retrieve (at 216) the resource metadata and the MCTP data from the BMC 204. After the last reboot of the quantity of reboots has been initiated, the EID fault detection engine 114 can wait a specified amount of time after requesting the reboot, to allow the server computer 202 to complete its reboot. Alternatively, the control system 110 may receive an acknowledgement from the BMC 204 that the reboot of the server computer 202 has completed.

In some examples, the resource metadata can be obtained using first location information, and the MCTP data can be obtained using second location information. For example, the location information can be in the form of a uniform resource identifier (URI), such as a REST URI. In such examples, the resource metadata is associated with a first REST URI, and the MCTP data is associated with a second REST URI that is different from the first REST URI. The EID fault detection engine 114 can access a REST API to request the resource metadata using the first REST URI, and similarly, the EID fault detection engine 114 can access the REST API to request the MCTP data using the second REST URI.

In other examples, the location information of the resource metadata and the MCTP data can include different location information, such as any or some combination of the following: a uniform resource locator (URL), a path name of a file in a file system, a memory or storage address, or any other location information. The EID fault detection engine 114 requests, from the BMC 204, the resource metadata using the first location information of the resource metadata, and the MCTP data using the second location information of the MCTP data.

The EID fault detection engine 114 processes (at 218) the resource metadata to extract device component properties (e.g., which may include designated keywords). The extracted device component properties represent device components in the server computer 202 that are subject to an CTP management. Based on the extracted device component properties, the EID fault detection engine 114 determines (at 220) how many device components should be in the server computer 202 that are to be assigned respective EIDs in MCTP operations. The determined quantity of device components based on the resource metadata can be represented with a variable QD (quantity of device components).

The EID fault detection engine 114 also processes (at 222) the MCTP data to extract EIDs assigned to device components of the server computer 202 by MCTP operations.

The EID fault detection engine 114 determines (at 224), based on the resource metadata and the MCTP data, whether the quantity of assigned EIDs in the MCTP data matches the quantity of device components (QD) indicated by the resource metadata.

If the quantity of assigned EIDs in the MCTP data matches the quantity of device components (QD) indicated by the resource metadata, the EID fault detection engine 114 proceeds to task 228. However, if the quantity of assigned EIDs in the MCTP data is less than the quantity of device components (QD) indicated by the resource metadata, then the EID fault detection engine 114 can make a determination (at 226) that an EID loss has occurred.

The EID fault detection engine 114 also determines (at 228), based on the MCTP data, whether the same EID is assigned to more than one device component. If not, the EID fault detection engine 114 proceeds to task 232. If the same EID is assigned to more than one device component, the EID fault detection engine 114 makes a determination (at 230) that EID duplication has occurred.

Other possible EID mis-assignments can include one or more of the following: the MCTP data contains more EIDs than the quantity of device components (QD) indicated by the resource metadata, an assigned EID in the MCTP data has a wrong form, and so forth.

In response to detecting any EID mis-assignment (e.g., an EID loss or an EID duplication), the EID fault detection engine 114 can trigger (at 232) a remediation action. A remediation action can include sending an alert to a target entity, such as a user, a program, or a machine. Alternatively or additionally, the remediation action can include the EID fault detection engine 114 sending a command to the BMC 204 for disabling the server computer 202 or a portion of the server computer 202.

If no EID mis-assignment was detected, the EID fault detection engine 114 take no further action.

In examples where there are multiple server computers, the control system 110 can be used to detect EID faults in the multiple server computers. For example, multiple instances of the EID fault detection engine 114 can run to check, in parallel, whether there are EID faults in the multiple server computers.

The ability to detect faults based on EID mis-assignment improves the stability of electronic devices with device components that are supposed to be assigned EIDs in MCTP operations (or more generally, assigned identifiers in management operations). A configurable quantity of reboots of an electronic device (a managed system) can be specified to stress test the electronic device for the purpose of increasing the chances that any faults associated with MCTP operations (or more generally management operations) can be detected. The detection of EID mis-assignments can be accomplished using an external tool, such as the control system 110 of FIG. 1, which means that electronic devices do not have to be reconfigured to support EID mis-assignment detection.

Figure 3:
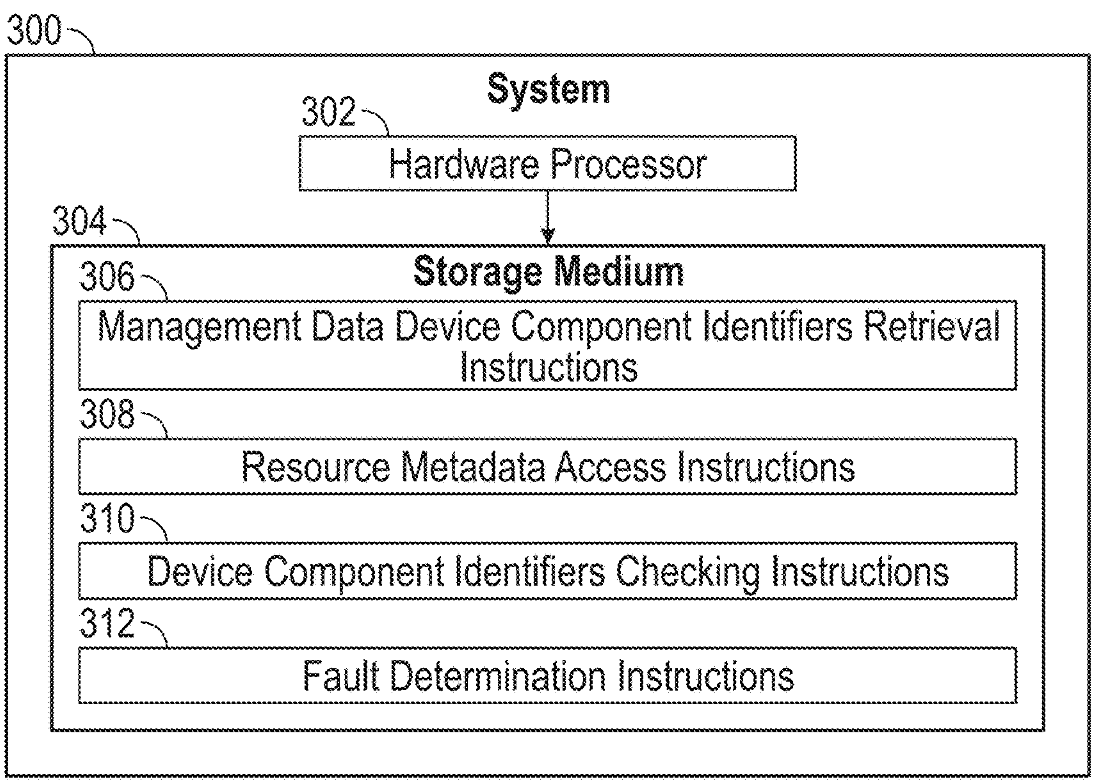
FIG. 3 is a block diagram of a system according to some examples.

FIG. 3 is a block diagram of a system 300 according to some examples of the present disclosure. The system 300 can be implemented using one or more computers. An example of the system 300 is the control system 110 of FIG. 1.

The system 300 includes a hardware processor 302 (or multiple hardware processors). The system 300 further includes a non-transitory machine-readable or computer-readable storage medium 304 storing machine-readable instructions executable on the hardware processor 302 to perform various tasks. Machine-readable instructions executable on a hardware processor can refer to the instructions executable on a single hardware processor or the instructions executable on multiple hardware processors.

The machine-readable instructions include management data device component identifiers retrieval instructions 306 to retrieve, from a management controller of an electronic device, identifiers of device components in the electronic device, where the retrieved identifiers of the device components are assigned in management operations according to a management protocol. An example of the management controller is a BMC. The management protocol can include the MCTP, and the identifiers of device components can include EIDs assigned in MCTP operations in the electronic device. The electronic device may include a server computer or another type of electronic device.

The machine-readable instructions include resource metadata access instructions 308 to access resource metadata representing resources of the electronic device, the resource metadata stored at the management controller. The resource metadata can indicate a quantity of device components in the electronic device according to a configuration of the electronic device, e.g., as configured by a manufacturer, an assembler, or another entity.

The machine-readable instructions include device component identifiers checking instructions 310 to check the retrieved identifiers assigned in the management operations according to the management protocol based on information of the resources represented by the resource metadata. For example, the device component identifiers checking instructions 310 can compare a quantity of the retrieved identifiers assigned in the management operations to the quantity of device components indicated by the resource metadata. As another example, the device component identifiers checking instructions 310 can check whether multiple device components are assigned a same identifier.

The machine-readable instructions include fault determination instructions 312 to, based on the check, determine whether a fault is present in the electronic device. The fault can include an EID loss and/or duplicative EID assignments, for example.

In some examples, the machine-readable instructions instruct the electronic device to reboot, e.g., by sending a reboot command to the electronic device. The retrieval of the identifiers assigned in the management operations according to the management protocol is performed after the reboot of the electronic device.

In some examples, the management operations according to the management protocol are performed in the electronic device responsive to the reboot.

In some examples, the machine-readable instructions obtain information specifying how many reboots of the electronic device are to be performed. The obtained information can include the reboot parameter 118 of FIG. 1, for example. The machine-readable instructions trigger a quantity of reboots of the electronic device based on the obtained information. The retrieval of the identifiers assigned in the management operations according to the management protocol is performed after the quantity of reboots of the electronic device.

In some examples, the quantity of reboots specified by the obtained information is part of a stress test of the electronic device.

In some examples, the management operations according to the management protocol are over one or more buses of the electronic device, and the device components include bus components connected to the one or more buses.

In some examples, the management controller is a management bus owner to obtain the identifiers of the device components using the management operations according to the management protocol over one or more buses.

In some examples, the resource metadata includes Redfish resource metadata, which can be stored in one or more JSON files.

In some examples, the retrieved identifiers of the device components are from management data accessible using a first REST URI, and the resource metadata is accessible using a different second REST URI.

Figure 4:
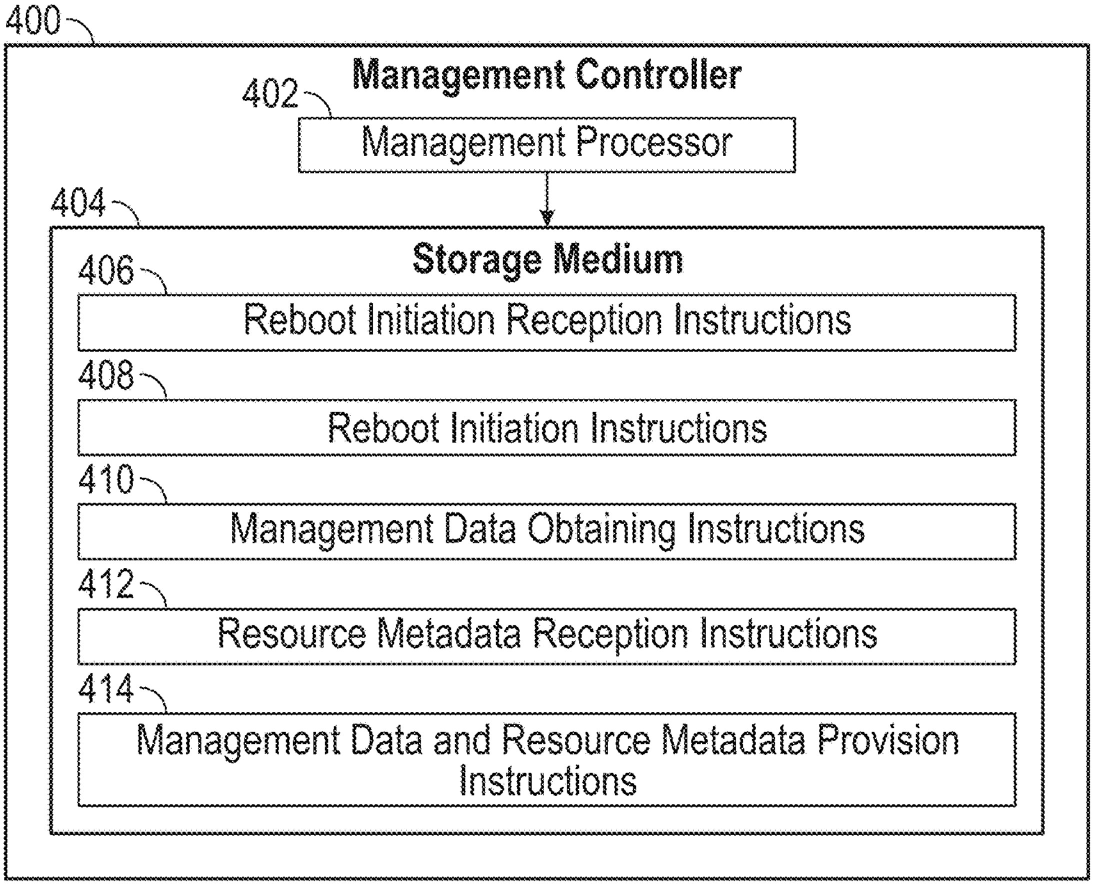
FIG. 4 is a block diagram of a management controller according to some examples.

FIG. 4 is a block diagram of a management controller 400 for an electronic device, according to some examples of the present disclosure. The management controller 400 includes a management processor 402, which is separate from a host processor in the electronic device. The host processor is used to execute primary machine-readable instructions (e.g., an OS and/or application programs) of the electronic device.

The management controller 400 further includes a storage medium 404 storing machine-readable instructions executable on the management processor 402 to perform various tasks.

The machine-readable instructions of the management controller 400 include reboot instruction reception instructions 406 to receive, from a control system, an instruction to reboot the electronic device. The instruction to reboot may include a reboot command sent by the control system to the management controller 400 over a management network.

The machine-readable instructions of the management controller 400 include reboot initiation instructions 408 to, based on the instruction to reboot, cause the reboot of the electronic device, the reboot of the electronic device to trigger management operations according to a management protocol that cause assignment of EIDs to device components in the electronic device. The management protocol can include the MCTP, for example.

The machine-readable instructions of the management controller 400 include management data obtaining instructions 410 to obtain management data including the EIDs. In some examples, the management controller 400 is an MCTP bus owner to initiate MCTP operations that assign EIDs.

The machine-readable instructions of the management controller 400 include resource metadata reception instructions 412 to receive resource metadata representing resources of the electronic device. The resource metadata indicates a quantity of device components in the electronic device according to a configuration of the electronic device, e.g., as configured by a manufacturer, an assembler, or another entity.

The machine-readable instructions of the management controller 400 include management data and resource metadata provision instructions 414 to provide, from the management controller to the control system over a management network, the management data and the resource metadata for a determination, based on the management data and the resource metadata, of any EID mis-assignment in the electronic device. The EID mis-assignment can include an EID loss or duplicative EID assignments.

In some examples, the machine-readable instructions of the management controller 400 receive, from the control system, information related to the EID mis-assignment. The information related to the EID mis-assignment may indicate the specific EID mis-assignment, such as an EID loss or duplicative EID assignments. The information related to the EID mis-assignment can include an indication to perform a remediation action, such as to disable the electronic device or a portion of the electronic device. Based on the received information of the endpoint identifier mis-assignment, the management controller 400 triggers a remediation action in the electronic device.

Figure 5:
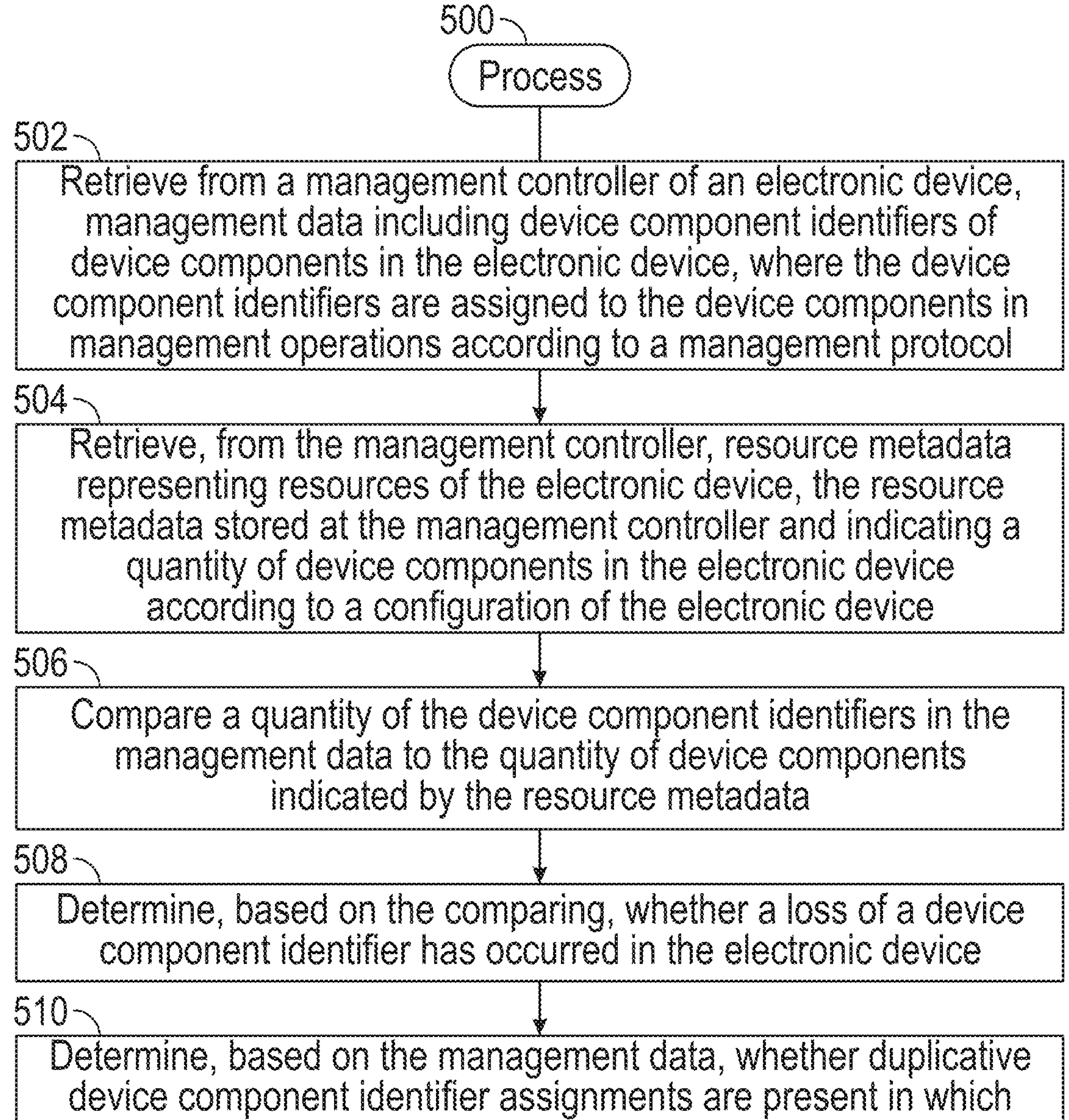
FIG. 5 is a flow diagram of a process according to some examples.

FIG. 5 is a flow diagram of a process 500 according to some examples of the present disclosure. The process 500 can be performed by the control system 110 of FIG. 1, for example.

The process 500 includes retrieving (at 502), from a management controller of an electronic device, management data including device component identifiers (e.g., EIDs) of device components in the electronic device, where the device component identifiers are assigned to the device components in management operations according to a management protocol. The management data may be retrieved using management data location information (e.g., a management data REST URI), for example.

The process 500 includes retrieving (at 504), from the management controller, resource metadata representing resources of the electronic device, the resource metadata stored at the management controller and indicating a quantity of device components in the electronic device according to a configuration of the electronic device. The configuration of the electronic device may be performed by a manufacturer, an assembler, or another entity.

The process 500 includes comparing (at 506) a quantity of the device component identifiers in the management data to the quantity of device components indicated by the resource metadata.

The process 500 includes determining (at 508), based on the comparing, whether a loss of a device component identifier has occurred in the electronic device. The loss of the device component identifier results from one or more device components not being assigned a device component identifier.

The process 500 includes determining (at 510), based on the management data, whether duplicative device component identifier assignments are present in which multiple device components in the electronic device are assigned a same device component identifier.

A "BMC" (e.g., the BMC 132 or 13N of FIG. 1) can refer to a specialized service controller that monitors the physical state of an electronic device using sensors and communicates with a remote management system (that is remote from the electronic device) through an independent "out-of-band" connection through a network interface of the BMC. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access to the electronic device (to access the electronic device over a network, for example), remote reboot of the electronic device (to trigger the computer system to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a host processor, a memory, an input/output (I/O) device, etc.) of the electronic device.

A storage medium (e.g., 304 in FIG. 3 or 404 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:

a processor; and a non-transitory storage medium storing instructions executable on the processor to:

retrieve, from a management controller of an electronic device, identifiers of device components in the electronic device, wherein the retrieved identifiers of the device components are assigned in management operations according to a management protocol;

access resource metadata representing resources of the electronic device, the resource metadata stored at the management controller;

check the retrieved identifiers assigned in the management operations according to the management protocol based on information of the resources represented by the resource metadata; and based on the check, determine whether a fault is present in the electronic device, wherein the retrieved identifiers of the device components are from management data accessible using a first REpresentational State Transfer (REST) uniform resource identifier (URI), and the resource metadata is accessible using a different second REST URI.

2. The system of claim 1, wherein the instructions are executable on the processor to:

instruct the electronic device to reboot, wherein the retrieving of the identifiers assigned in the management operations according to the management protocol is performed after the reboot of the electronic device.

3. The system of claim 2, wherein the management operations according to the management protocol are performed in the electronic device responsive to the reboot.

4. The system of claim 2, wherein the instructions are executable on the processor to:

obtain information specifying how many reboots of the electronic device are to be performed; and trigger a quantity of reboots of the electronic device based on the obtained information, wherein the retrieving of the identifiers assigned in the management operations according to the management protocol is performed after the quantity of reboots of the electronic device.

5. The system of claim 4, wherein the quantity of reboots specified by the obtained information is part of a stress test of the electronic device.

6. The system of claim 1, wherein the management operations according to the management protocol are over one or more buses of the electronic device, and the device components comprise bus components connected to the one or more buses.

7. The system of claim 6, wherein the management controller is a management bus owner to obtain the identifiers of the device components using the management operations according to the management protocol over one or more buses.

8. The system of claim 1, wherein the resource metadata comprises Redfish resource metadata.

9. The system of claim 1, wherein the determining of whether the fault is present in the electronic device comprises detecting a loss of a first identifier of a device component based on a quantity of the identifiers of the device components being less than a quantity of device components indicated in the resource metadata.

10. The system of claim 1, wherein the determining of whether the fault is present in the electronic device comprises detecting duplicative identifier assignments to multiple device components by the management operations according to the management protocol, wherein the duplicative identifier assignments assign a same identifier to the multiple device components in the electronic device.

11. The system of claim 1, wherein the electronic device is a first electronic device, and the instructions are executable on the processor to:

retrieve, from a second management controller of a second electronic device, second identifiers of device components in the second electronic device, wherein the retrieved second identifiers of the device components of the second electronic device are assigned in management operations according to the management protocol in the second electronic device;

access second resource metadata representing resources of the second electronic device, the second resource metadata stored at the second management controller;

check the retrieved second identifiers based on information of the second resource metadata; and based on the check of the retrieved second identifiers, determine whether a fault is present in the second electronic device.

12. The system of claim 1, wherein the retrieved identifiers are part of management data stored by the management controller, and wherein the system is to access the management data and the resource metadata from the management controller over an out-of-band network to the management controller.

13. The system of claim 1, wherein the resource metadata comprises a JavaScript Object Notation (JSON) file, and the identifiers of device components are part of properties of the JSON file.

14. A management controller for an electronic device, comprising:

a management processor; and a non-transitory storage medium storing instructions executable on the management processor to:

receive, from a control system, an instruction to reboot the electronic device;

based on the instruction to reboot, cause the reboot of the electronic device, the reboot of the electronic device to trigger management operations according to a management protocol that cause assignment of endpoint identifiers to device components in the electronic device;

obtain management data comprising the endpoint identifiers;

receive resource metadata representing resources of the electronic device, the resource metadata indicating a quantity of device components in the electronic device according to a configuration of the electronic device; and provide, from the management controller to the control system over a management network, the management data and the resource metadata for a determination, based on the management data and the resource metadata, of any endpoint identifier mis-assignment in the electronic device.

15. The management controller of claim 14, wherein the instructions are executable on the management processor to:

receive, from the control system over the management network, a plurality of instructions to perform multiple reboots of the electronic device, wherein the obtained management data comprises the endpoint identifiers assigned in the management operations performed in response to a last reboot of the multiple reboots.

16. The management controller of claim 14, wherein the management operations comprise Management Component Transport Protocol (MCTP) operations.

17. The management controller of claim 14, wherein the instructions are executable on the management processor to:

receive, from the control system, information related to the endpoint identifier mis-assignment; and based on the received information related to the endpoint identifier mis-assignment, trigger a remediation action in the electronic device.

18. A method comprising:

retrieving, by a control system from a management controller of an electronic device, management data comprising device component identifiers of device components in the electronic device, wherein the device component identifiers are assigned to the device components in management operations according to a management protocol;

retrieving, by the control system from the management controller, resource metadata representing resources of the electronic device, the resource metadata stored at the management controller and indicating a quantity of device components in the electronic device according to a configuration of the electronic device;

comparing, by the control system, a quantity of the device component identifiers in the management data to the quantity of device components indicated by the resource metadata;

based on the comparing, determining, by the control system, whether a loss of a device component identifier has occurred in the electronic device; and determining, by the control system based on the management data, whether duplicative device component identifier assignments are present in which multiple device components in the electronic device are assigned a same device component identifier.

19. The method of claim 18, further comprising:

obtaining, by the control system, information specifying how many reboots of the electronic device are to be performed; and triggering a quantity of reboots of the electronic device based on the obtained information, wherein the retrieving of the management data is performed after the quantity of reboots of the electronic device.

* * * * *